Aug. 21, 1928.

E. L. NORTON

WAVE FILTER

Filed Nov. 24, 1924    2 Sheets-Sheet 1

Inventor:
Edward L. Norton,
by Ewadams  Atty

Aug. 21, 1928.
E. L. NORTON
WAVE FILTER
Filed Nov. 24, 1924
1,681,554
2 Sheets-Sheet 2
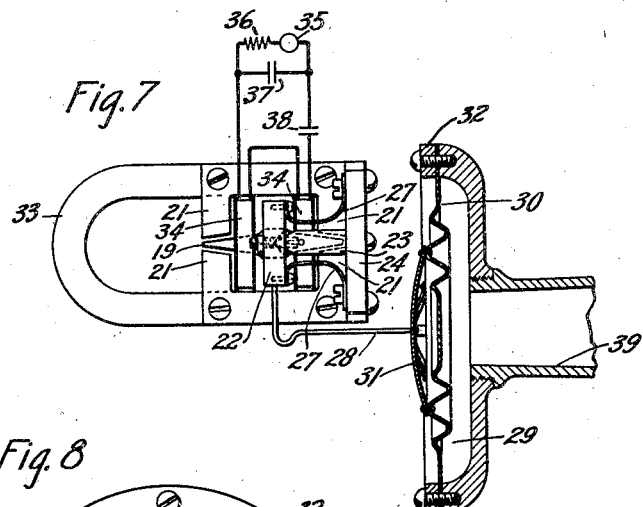
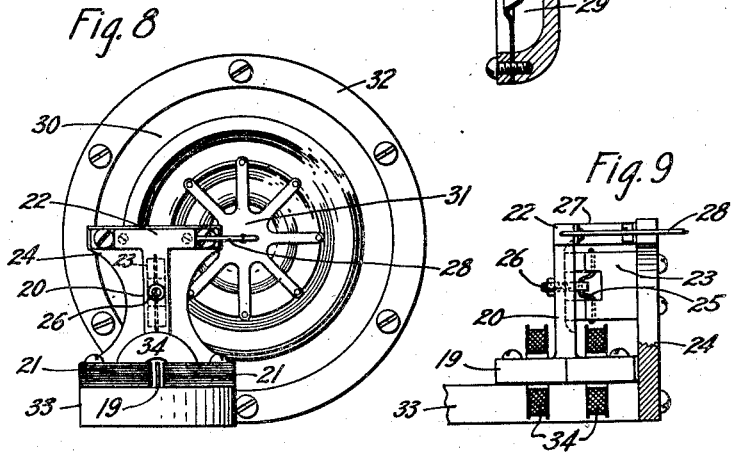
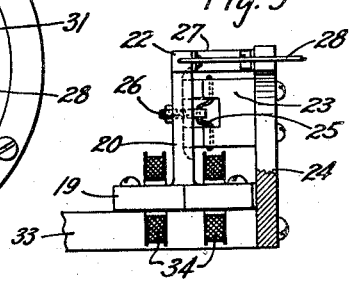
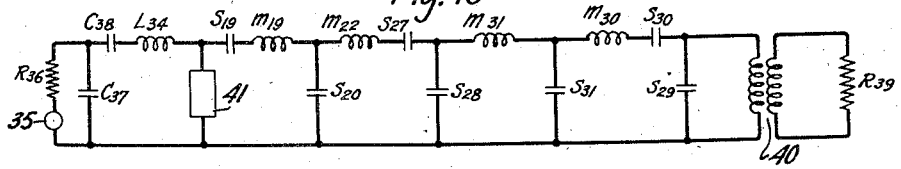
Inventor:
Edward L. Norton,
by ─── Atty Patented Aug. 21, 1928.

1,681,554

UNITED STATES PATENT OFFICE.

EDWARD L. NORTON, OF NEW YORK, N. Y., ASSIGNOR TO WESTERN ELECTRIC COMPANY, INCORPORATED, OF NEW YORK, N. Y., A CORPORATION OF NEW YORK.

WAVE FILTER.

Application filed November 24, 1924. Serial No. 751,748.

This invention relates to selective wave transmission systems, and more particularly to broad band wave filters.

An object of the invention is to combine in a single device the functions of frequency selection and of wave motion transformation.

Another object is to increase the transfer of energy in selective wave systems having terminal impedances of unequal magnitudes.

Another object is to provide a wave filter, either electrical or mechanical, adapted to operate with maximum efficiency between unequal impedances.

A special object is to increase the efficiency of the translation of electric wave energy into the energy of sound waves.

Other objects of the invention will appear from the description which follows of the principles and operation of the invention.

The term "broad band wave filter" refers to the general class of device described in U. S. patent to Campbell, 1,227,113, May 27, 1917, and by G. A. Campbell, Physical theory of the electric wave filter, Bell System Technical Journal, Vol. I—No. 2, November 1922, and again by O. J. Zobel, Theory and design of uniform and composite electric wave filters, Bell System Techanical Journal, Vol. II—No. 1, January 1923. In these references, the physical theory and the principles of design are developed with particular reference to electrical systems, but it is recognized that the same principles are applicable to the discrimination between wave motions of any type regardless of the medium in which the waves are transmitted.

One particular embodiment of the invention hereinafter described is in a loud speaking telephone receiver, the electrical, mechanical and acoustical elements of which are arranged to constitute a single broad band filter through which energy is propagated successively by electric waves, mechanical vibrations, and sound waves.

To elucidate more fully the principles and scope of the invention, other devices in the form of mechanical wave filters are described, these being particularly chosen to demonstrate the correspondence between the elements of a mechanical system and those of the analogous electrical system. The theory of wave filters having been developed and disclosed principally in relation to electrical systems, its application to other types of motion is less familiarly understood on account of the lack of familiar elements and structures corresponding clearly to the parts of an electrical system.

In wave signaling systems, the transmission of maximum energy from a given source is the principal object of the design, and to attain this it is a well known proposition that the impedances at the junction points of successive sections must be properly matched to avoid reflection losses. If these impedances are not naturally equal, the common practice is to insert transformers at the junction points, the transformation ratios of which compensate the inequality of the impedances. Practical difficulties, however, make it impossible to construct transformers that do not dissipate some of the energy of the waves transmitted through them. They are also limited with respect to the range of frequencies freely transmitted, low frequency waves being attenuated by the low impedances of the windings and high frequency waves being absorbed in the electrostatic capacities of the windings.

In selective transmission systems, the range of frequencies is purposely limited by the insertion of band filters. Also, in certain types of system, which necessarily include chains of functional elements having reactances of different kinds, it is advantageous to proportion the elements so that they combine to operate as a wave filter of limited frequency range. The loud speaking telephone in which the present invention is embodied, is an example of the latter application.

In accordance with the present invention, wave filters may be constructed that possess not only the property of frequency discrimination, but also that of wave motion transformation without loss of energy. Such filters may, therefore, be used advantageously in selective transmission systems, the number of transformers required being reduced thereby. The elimination of transformers, however, is not the only advantage of the invention; impedance transformations may be made at several points within a wave filter without affecting the overall ratio of transformation, but permitting the magnitudes of the individual reactances to be changed to such values as may be most economically obtained in practical physical structures.

The application of the general physical theory of wave filters follows from the fact that the laws governing the motion of electricity are but special cases of the general dynamical laws of motion. The extension of the wave filter theory, in so far as is necessary for the proper understanding of the invention, to other modes of motion will be facilitated by noting the analogous properties of motion in various systems set forth in the following table:

| Mechanical motion | | Electric motion |
|---|---|---|
| Linear | Angular | |
| Force | Torque | E. M. F. |
| Displacement | Angle | Quantity of electricity. |
| Velocity | Angular velocity | Current. |
| Mass | Moment of inertia | Inductance. |
| Elastance | Torsional elastance | 1 ÷ capacity. |
| Flexibility | Torsional flexibility | Capacity. |
| Friction | Friction | Resistance. |

The terms "mass", "elastance", and "flexibility" define total properties of structural elements which are related to the specific quantities, density and elasticity. The reaction forces that a body opposes to an impressed force comprise components equal to the product of its mass and the acceleration of its motion and of its elastance and displacement. These are analogous to the back E. M. F.'s in an electrical circuit due to the rate of change of current in an inductance and to the displacement of electricity in a capacity. The quantitative relations between the properties of mechanical and electrical systems follow from the fact that energy is measured in the same absolute unit, the erg, in both systems. Motions in the two types of system are comparable if the reactance properties of the elements and the displacements are all measured in the absolute or c. g. s. units. In a composite system in which energy is translated from the electrical to the mechanical form, or vice versa, a factor relating to the velocities or the displacements in the two modes of motion must be known before the motions throughout the complete system can be determined.

In the foregoing table, the analogous quantities of both linear and angular motion are listed, but in the detailed description of mechanical systems which follows, the nomenclature relating to the linear type of motion will alone be used. The type of motion actually occurring will be understood from the context.

The analogy between electrical resistance and mechanical friction is not always complete; a constant electrical resistance is characterized by its property of dissipating energy at a rate proportional to the square of the current, and mechanical friction, to be analogous, must have the property of dissipating energy at a rate proportional to the square of the mechanical velocity. Ordinary mechanical friction does not possess this property and it is generally necessary to employ some form of fluid friction to obtain the equivalent of electrical resistance.

In electrical systems, it is easy to obtain structural elements possessing practically pure inductance or pure capacity by the choice of particular forms and materials in which one property predominates and the other is diminished. In like manner may elements possessing simple properties with reference to the other systems of motion be obtained. For example, a thin flat air space having its plane placed transversely to the direction of motion has compressibility with substantially no mass while a very narrow column of air having its axis in line with the direction of motion possesses mass with substantially no compressibility.

The nature of the invention and the manner of its application will be understood from the following detailed description taken in connection with the accompanying drawings of which;

Figures 1, 1ª and 2ª are for the purpose of illustrating the theory of the invention.

Figures 3 and 3ª show in schematic form an electric wave filter and a mechanical analogue for the purpose of comparison with Figures 4 and 4ª which represent the same filter modified to effect wave motion transformations.

Figures 5 and 5ª represent respectively a non-transforming wave filter and a wave filter of corresponding properties in which the invention is embodied to simplify the structure.

Figures 6 and 6ª illustrate a similar application of the invention.

Figure 7 shows a loud speaking telephone receiver embodying the invention.

Figures 8 and 9 are additional views of the receiver of Figure 7 to illustrate more clearly certain elements of the system, and Figures 10 and 11 illustrate in schematic form the wave filter system of the receiver shown in Figure 7.

*General principles.*

Figure 1:
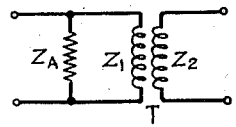
Figure 1A:
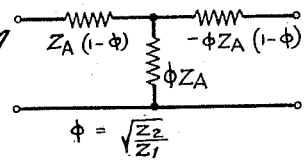
Figure 2:
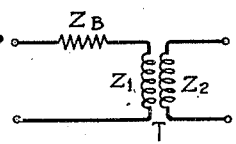
Figure 2A:
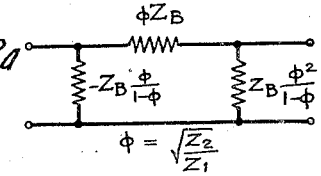

Two important equivalences by means of which the explanation of the principles of the invention is greatly simplified are illustrated in Figure 1 and 1ª and Figures 2 and 2ª respectively.

The four terminal network of Figure 1 comprises a shunt impedance $Z_A$ which is unrestricted as to form and an ideal transformer T. The transformer T is assumed to have windings of infinitely great inductance, perfect coupling and zero resistance. Further, the self impedances of the windings, although infinitely great, are assumed to bear a finite constant ratio as expressed by the equation $$\frac{Z_2}{Z_1} = \phi^2 \quad (1)$$

in which $Z_1$ and $Z_2$ denote respectively the primary and secondary impedances and $\phi$ is the ratio of transformation. Such a transformer could neither store nor dissipate any energy and would be equally effective at all frequencies as a transformer of wave motion. No physical structure can be made to embody these features but nevertheless, since practical transformers closely approximate to the ideal, the concept of the ideal transformer is of great convenience.

The four terminal T network of Figure 1<sup>a</sup> and the network of Figure 1 are equivalent with respect to the transmission of waves from left to right or from right to left. This may be demonstrated by deriving the formulæ for the received currents in the two networks when they are terminated in equal impedances at their right hand ends and subjected to equal E. M. F.'s impressed upon the left end terminals. In like manner, may the equivalence of the networks of Figures 2 and 2<sup>a</sup> be proved. It follows then that a three element T network in which each element has a finite impedance may be substituted for an ideal transformer having a finite impedance connected in parallel with one of its windings and that a Π network of finite impedances may replace an ideal transformer having a finite impedance connected in series with one of its windings. The impedance elements in the networks of Fig. 1<sup>a</sup> and Fig. 2<sup>a</sup> are respectively related by simple numerical factors to the impedances $Z_A$ and $Z_B$ of the prototype networks. These impedances may consist of simple reactances or resistances or they may comprise reactances and resistances in a complicated network in which case the branches of the equivalent networks consist of networks of similar form having the impedances of corresponding elements constantly related. Further, however, in the network of Fig. 1<sup>a</sup> the two series branch impedances are necessarily of opposite sign and in the network of Fig. 2<sup>a</sup> the two shunt impedances are also opposite in sign. To make the construction of these networks possible under all circumstances, it would be necessary to have available elements corresponding to both positive and negative mass or inductance, and to both positive and negative flexibility or capacity. Under certain circumstances, negative flexibility may be realized, as will be seen later, but in general this and negative mass are properties that cannot be imparted to any simple structural element.

*Application to electric wave filters.*

Although the transforming networks of Figures 1<sup>a</sup> and 2<sup>a</sup> cannot be physically embodied by themselves, yet they can be incorporated into wave filters and other structures, the only requirement being that there should be available in the network at the point where the transformation occurs, elements having corresponding positive properties of sufficient magnitude to absorb the negative properties of the transforming network. For example, the electrical filter structure of Figure 3<sup>a</sup> may be designed, in accordance with the principles and formulæ given in the references hereinbefore mentioned, to operate between terminal impedances of equal magnitude. The inductances and capacities so determined are denoted by the letter L and C with numerical subscripts to identify their location in the circuit. These quantities are related to the terminating impedance, which is shown as a resistance $R_1$, by factors involving the filter cutoff frequencies; it is not necessary, however, for the understanding of the present invention that these factors be known.

If it is desired to adapt the filter to unequal terminating impedances, recourse may be had to the use of one or more efficient transformers inserted at any points in the system. Let it be assumed that two successive step-down transformations are desirable, the first being made by the insertion of a transformer at the point indicated by the dotted line A—A' and the second by a transformer inserted at B—B'. In order that no internal reflection losses may be introduced the insertion of the transformers requires a modification of the constants of the filter impedance elements. If the first and second transformation ratios are respectively denoted by $\phi_1$ and $\phi_2$ then in accordance with well-known principles of circuit design, all elements to the right of AA' must be modified to have impedances equal to $\phi_1^2$ times the impedances of the normal design and those to the right of BB' must be further modified to have impedances reduced from the normal values in the total ratio $\phi_1^2 \times \phi_2^2$. The filter thus modified is found upon inspection to include a combination of the type shown in Fig. 1, namely the combination of modified capacity $\phi_1^2 C_3$ and the transformer inserted at BB', and also a combination corresponding to Fig. 2, namely the inductance $L_3$ and the transformer inserted at AA'. A further inspection shows that the circuit contains an inductance and a capacity by which the negative inductance and the negative capacity resulting from the substitution of the equivalent networks for the above-noted combinations may be absorbed.

Figure 4:
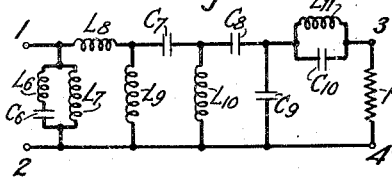
Figure 4A:
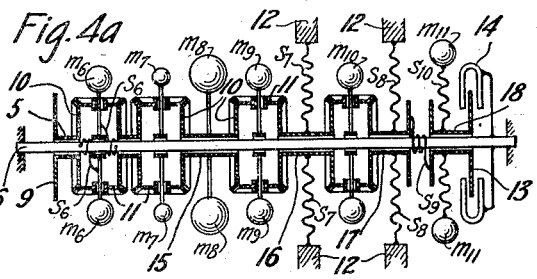

The network obtained finally as the result of making the substitutions is shown in Fig. 4. Since the transformation ratios $\phi_1$ and $\phi_2$ were both assumed to be less than unity, corresponding to step-down transformations, the substitution of the Π network equivalent to the combination of $L_3$ and the transformer results in a negative inductance in parallel with the combination $L_1, C_1, L_2$. It is not obvious that this combination can absorb the negative inductance in parallel but it is made evident by the application of a useful equivalence pointed out by Zobel in the reference hereinbefore mentioned. According to Zobel the combination $L_1 C_1 L_2$ may be replaced by a parallel combination comprising a single inductance of value $(L_1 + L_2)$ in parallel with a series resonant combination of an inductance $$L_2 \left(1 + \frac{L_2}{L_1}\right)$$

and a capacity $$C_1 \div \left(1 + \frac{L_2}{L_1}\right)^2.$$

The effective inductance of $L_1 + L_2$ in combination with the negative inductance of the first transforming network will have a positive magnitude so long as the inductance $(L_1 + L_2)$ is the smaller and consequently may under this condition be realized in a physical structure. The modified capacity $C_4 \div \phi_1^2 \phi_2^2$ will also combine with the negative capacity of the second transforming network to produce a resultant positive capacity so long as the former capacity is the smaller.

Figure 3:
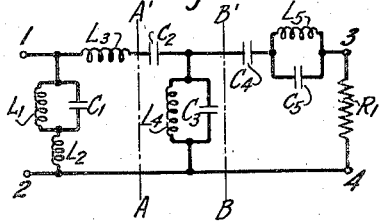
Figure 3A:
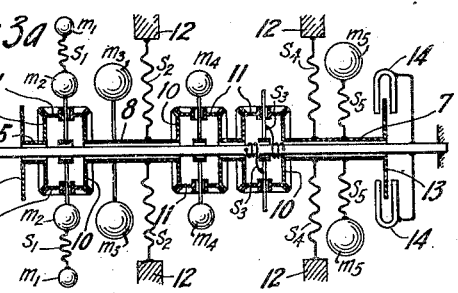

It is a simple matter now to write down the inductance and capacity values of the elements of Fig. 4 in terms of the values in Fig. 3 bearing in mind that in the transformation inductance and capacity values must be modified in opposite senses. The values follow:

$$L_6 = L_2\left(1 + \frac{L_2}{L_1}\right)$$

$$C_6 = C_1 \div \left(1 + \frac{L_2}{L_1}\right)^2$$

$$L_7 = \frac{(L_1 + L_2)\left(L_3 \frac{\phi_1}{1-\phi_1}\right)}{L_3 \frac{\phi_1}{1-\phi_1} - L_1 - L_2} \quad (2)$$

$$L_8 = \phi_1 L_3$$

$$L_9 = L_3 \frac{\phi_1^2}{1-\phi_1}$$

$$C_7 = C_2 \div \phi_1^2$$
$$L_{10} = L_4 \times \phi_1^2$$
$$C_8 = C_3 \div \phi_1^2 (1-\phi_2)$$
$$C_9 = C_3 \div \phi_1^2 \phi_2$$
$$C_{10} = C_5 \div \phi_1^2 \phi_2^2$$
$$L_{11} = L_5 \times \phi_1^2 \phi_2^2$$
$$R_2 = R_1 \times \phi_1^2 \phi_2^2$$

A capacity corresponding to $C_4$ has apparently been omitted between $C_9$ and the combination $C_{10}$ the value of which would have been $$\frac{C_3 C_4}{\phi_1^2 \phi_2 [\phi_2 C_3 - (1-\phi_2) C_4]} \quad (3)$$

The dropping out of this condenser illustrates the particular case in which the positive impedance of an element originally in the circuit is just sufficient to neutralize the negative impedance of the transforming network. It is evident that formula (3) under certain conditions denotes an infinite capacity, the impedance of which is zero.

*Application to mechanical wave filters.*

The application of the foregoing principles to mechanical wave filters is illustrated in Figs. 3ª and 4ª which represent in a conventional manner mechanical wave filters for torsional vibrations analogous to the electrical filters of Figs. 3 and 4 respectively. In the filter of Fig. 3ª the tortional vibrations are transmitted through a chain of elements rotatably mounted upon a fixed shaft 6. Motion is imparted to the system by torsional forces impressed upon a driving disc 9. Resistance to motion is present in the inertia and elastic reactions of the several elements constituting the chain, the impedances corresponding respectively to the inductive and the capacitive reactances of the electrical system. The masses $m_1, m_2, m_3, m_4,$ and $m_5,$ furnish the inertia reactions; the elastances are provided by springs having flexibility to torsional forces only and are denoted by $S_1, S_2, S_3, S_4,$ and $S_5$. To eliminate the effect of gravity as a controlling force the masses are arranged in pairs balanced about the centre line of the shaft; for symmetry the elastances are also arranged in balanced pairs. The pair of masses $m_1$ corresponds to the inductance $L_1$ of Fig. 3, the elastances $S_1$ correspond to the reciprocal of the capacity $C_1$, and so on throughout the two systems. The fixed shaft 6 corresponds to the common connection between the terminals 2 and 4 of Fig. 3. The successive series branches from left to right between the terminals 1 and 3 of the electrical filter have their counterparts in the rotatable sleeves 5, 8 and 7 and the elements attached thereto. The shunt impedances are represented in the mechanical structure by systems of masses and elastances attached to light rigid spindles adapted to rotate about the main shaft in a plane perpendicular thereto and to be capable of motions distinct from those of the series elements. These impedances comprise the elements $m_1$ $m_2$ and $S_1$ and also the elements $m_4$ and $S_3$. The connections between the series and the shunt arms are made through bevel gear wheels 10 and pinions 11 the latter being arranged to rotate freely upon shunt system spindles. The effect of the resistance $R_1$ in which the electrical filter is terminated is obtained in the mechanical system by means of a conductive disc 13 attached to sleeve 7 and rotating between the poles of permanent magnets 14. The interaction between the flux of the magnets and the induced currents in the disc produces a drag which is proportional to the velocity of the motion of the disc and is therefore a correct analogy of constant electrical resistance. The springs $S_2$ and $S_4$ which contribute part of the series branch impedances are shown with their outer ends connected to external abutments 12 which may be regarded either as fixed points or as masses of infinitely great inertia. The shunt combination $L_4C_3$ of Fig. 3 appears in Fig. 3ª as two separate shunt systems in one of which the masses $m_4$ is driven by a bevel gear system and in the other of which a light spindle, restrained from motion about the shaft by the coiled springs $S_3$, is similarly driven.

The similarity of the transmission characteristics of the two systems may be demonstrated by examining their actions under corresponding types of impressed force. A torque applied to the driving disc 9 corresponds to an E. M. F. applied to terminals 1 and 2. If the E. M. F. applied to the electrical filter is steady and unidirectional, the resultant current will be confined to inductances $L_1$ and $L_2$ and will be limited only by the small resistances of these elements. The condenser $C_2$ will block the current flow in the other branches of the circuit but there will be an electrical displacement in each of the condensers dependent on their relative capacities. Similarly a steady torque applied to the mechanical filter will result in a continuous motion of the masses $m_1$ and $m_2$ but the remaining parts will be held fixed in slightly displaced positions by the restraints of the various springs.

An E. M. F. of the frequency at which the combination $L_5C_5$ is resonant will be strongly attenuated. The total current in the second series branch will be practically zero although a large circulating current will flow around the closed resonant circuit. In the mechanical system a vibrating torque of the frequency at which the combination $m_5S_5$ is resonant will produce practically zero motion of the sleeve 7. The combination $m_5S_5$ is equivalent to a series anti-resonant electrical circuit; at resonance the mass and the spring oscillate violently themselves but impede strongly any motion of the point of support 7.

The system $m_1S_1$ is of similar type and therefore at some frequency causes the shunt arm to have an infinitely great impedance, a like effect being produced in the electrical system at the resonance of $L_1C_1$. At frequencies much above resonance the mass $m_1$ tends to remain stationary and the combination exhibits the properties of a spring anchored at its outer end. The elastance of the combination at some higher frequency resonates with the mass $m_2$ causing the latter to oscillate strongly about the shaft 6. When the impressed torque produces resonance of $m_1$ and $S_1$ the motion of the mass $m_2$ is practically reduced to zero with the result that the whole motion of the driving disc is passed on through the gear system to the sleeve 8. When the second type of resonance occurs the mass $m_2$ in resonance follows the synchronous impressed force so readily that the whole motion imparted to the driving disc is absorbed by the shunt system. The motions of the other parts of the system are similarly related to the currents in corresponding electrical elements.

The filter of Fig. 4ª has similar characteristics to that of Fig. 3ª but is adapted to transform the wave motion in the same manner as does its electrical counterpart. The rotating sleeves 5, 15, 16, 17 and 18 and the connected elements constitute the series branches of the system corresponding to the successive series sections of the electrical line from left to right between the terminals 1 and 3' of Fig. 4. Corresponding elements are indicated by like subscripts in the same manner as in Figs. 3 and 3ª.

The system $m_6S_6$ is a series-resonant shunt combination, the characteristics of which are obvious in view of the foregoing explanation. The spring $S_9$ coupling series elements 17 and 18 is an alternative and simpler form of shunt elastance, the relationship of which to the shunt elastance $S_3$ of Fig. 3ª is also readily seen. The reduced terminating impedance corresponding to $R_2$ is most readily obtained by reducing the thickness of the eddy current disc 13, the induction drag being correspondingly reduced thereby.

It should be noted in passing that the bevel gear connections of the shunt elements reduce the angular velocities of these elements in the ratio of two to one and reverses the direction of motion between successive series sections. These effects are the same as would be produced in the electrical system by the introduction of a pair of equal ideal two to one ratio transformers at each shunt branch. They are immaterial with regard to the overall properties of the filters, but in applying filter formulæ to the computation of the shunt masses and elastances due allowance for the velocity transformation must be made.

The velocity transforming property of the mechanical filter of Fig. 4ª is obtained not by the use of reduction gears which are closely analogous to ideal transformers but by the modification of the elastic and inertia constants of the system in accordance with the principles of the invention. The relationships previously listed between the coefficients of the elements of Figs. 3 and 4, hold also between those of Figs. 3ª and 4ª when masses are substituted for inductances and flexibilities or the reciprocals of the elastances, are substituted for capacities.

It should be observed that a characteristic feature of the shunt elements is their capability to absorb some of the velocity of a series element thereby reducing the velocity in a subsequent series element. In the mechanical systems described above the series and shunt impedances occupy relative positions closely similar to those of the corresponding electrical impedances but in other mechanical systems the arrangement may have but little correspondence to the conventional electrical arrangement. In such cases, the above-noted feature of shunt impedances is helpful in distinguishing them from series impedances.

*Systems having unique values of transformation ratio.*

Figure 5:
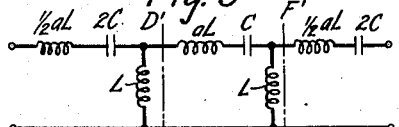
Figure 5A:
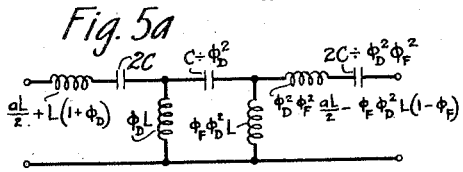

The systems of Figs. 5, 5ª, 6 and 6ª illustrate the application of certain limiting values of the transformation ratio for the purpose of reducing the number of impedance elements required in a given filter. For simplicity the electrical conventions are used in these figures but in view of the foregoing description, it is evident that they may represent conventionally wave filters for motion of any type.

The filter of Fig. 5 comprises two complete mid series terminated sections of a well-known type and is of symmertical form suitable for operation between equal terminating impedances. The full series inductance is related to the full shunt inductance L by a constant factor $a$ the nature of which will be described later. The filter may be modified for efficient operation between unequal impedances by effecting transformations at the sections DD' and FF' in accordance with the methods already described in connection with Fig. 3. In this instance, both transformations are effected by substituting for the shunt inductances T networks of the type shown in Fig. 1ª. Denoting the transformation ratios at D and F respectively by $\phi_D$ and $\phi_F$, expressions for the constants of the elements in the modified filter are readily obtained. The central series branch will contain a capacity corresponding to the original capacity C but modified in accordance with the transformation ratio $\phi_D$. It will also contain an inductance which is equal to the sum of the transformed inductance corresponding to $aL$ and the components contributed by the inserted T networks. The value of $L_e$ of this resultant inductance is given by the equation $$L_e = \phi_D{}^2 aL - \phi_D(1-\phi_D)L + \phi_D{}^2(1-\phi_F)L \quad (4)$$

and is zero under the conditions expressed by the further equation $$a = \frac{1 - 2\phi_D + \phi_D \phi_F}{\phi_D} \quad (5)$$

By a proper choice of the transformation ratios a new structure, as shown in Fig. 5ª, is obtained which has one less element than the network of Fig. 5 but which possesses the same transmission characteristics as the latter network together with an ideal transformer having a ratio $\phi_D \times \phi_F$.

The following particular cases are of importance.

First, in which $\phi_F = 1 \div \phi_D$. The double section is adapted for operation between equal impedances, the transformation ratio being given by the equation $$\phi_D = \frac{2}{a+2} \quad (6)$$

Second, in which $\phi_F$ is unity. Only one transformation is made the ratio being $$\phi_D = \frac{1}{1+a} \quad (7)$$

Third, in which $\phi_F = \phi_D$. This represents the case of a uniformly tapered line of similar sections. For this case $$\phi_D = \left(1 + \frac{a}{2}\right) \pm \frac{a}{2}\sqrt{1 + \frac{4}{a}} \quad (8)$$

The two values indicated by the plus and minus signs are reciprocally equal, one corresponds to a continued step up transformation from left to right and the other to a continued step-down transformation. A difficulty arises in the termination of a structure of this type as the final step down transformation leaves in the end series arm a negative inductance which is large enough to balance not only the natural full series inductance of the arm but also the component that would be added by a further stage of transformation. A mid series termination would therefore require the use of an element having negative inductance and consequently could not be embodied in any physical structure. In general, however, after several stages of step-down transformation the actual magnitudes of the series inductances would be relatively very small and the elements could be omitted without noticeable effect upon the transmission characteristic. In certain cases an additional filter section of a different type may be added in which the series inductance is large enough to balance the negative inductance due to the last transformation. For a discussion of the principles governing the connection of filter sections of different types reference is made to the aforementioned article by Zobel.

Figure 6:
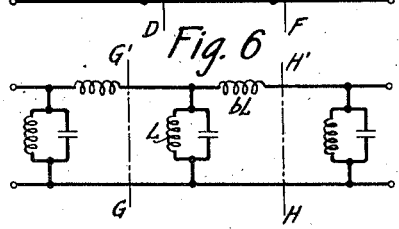
Figure 6A:
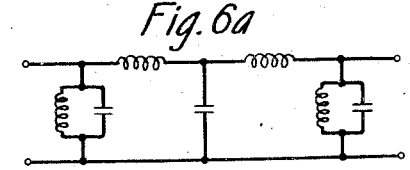

Another example of the application of the invention to the reduction of the number of elements in a filter network is illustrated by Figs. 6 and 6ª, the former representing a two section mid-shunt terminated filter of symmetrical structure, and the latter representing the structure resulting from special transformation effected at the points GG' and HH'. In this instance, a shunt inductance has been eliminated.

The condition for the elimination of the shunt element is expressed by the equation $$b = \frac{1 - 2\phi_H + \phi_G \phi_H}{\phi_H} \quad (9)$$

in which $b$ is the ratio of the full series inductance of Fig. 5 to the full shunt inductance, and $\phi_G$ $\phi_H$ are respectively the transformation ratios at points G and H. In the two cases illustrated the factors $a$ and $b$ are each equal to $$\frac{4f_1^2}{f_2^2-f_1^2} \quad (10)$$

in which $f_1$ and $f_2$ are respectively the lower and upper cutoff frequencies of the filters. This follows from a comparison of the formulæ for the constants of these filters given in U. S. patent to Campbell No. 1,227,113, May 27, 1917. The more general design formulæ in the Zobel reference hereinbefore mentioned show that any series element is related to any shunt element of the same kind by a constant factor which depends only upon the ratios of the cutoff frequencies and the frequencies of infinite attenuation.

The types of filter section in the joining of which an impedance element may be eliminated are principally those in which either the series or the shunt arm includes only a single element. It is not necessary, however, that the sections joined be of the same type as was shown in connection with the description of Fig. 4. When the filter sections are of unlike types a ratio corresponding to $a$ or $b$ may be found from the coefficients of the completed filter as designed for symmetrical termination and the proper ratio computed therefrom.

*Application of invention to loud speaking telephone.*

Figs. 7, 8 and 9 illustrate a loud speaking telephone receiver in which the invention is embodied for the purpose of improving both the efficiency and the quality of the speech reproduction. The general objects in the design of loud speaking telephones are two in number and are about equally important. The first object is to secure in the sound waves a perfect reproduction of the electric current undulations. The second is to effect the translation of all the electric energy into sound wave energy. The production of sound waves is most efficiently accomplished by the use of a mechanical device to produce displacements of the air and in consequence it is customary to convert the electric waves into an intermediate mechanical motion. The achievement of high efficiency in the two translations requires that the impedance at one end of the mechanical system must equal that of the electrical system and the impedance at the other end must equal that of the acoustic system. In general, some kind of transforming linkage must be used in the mechanical system but with practical materials and structure forms it is extremely difficult, if not impossible, to construct a mechanism of this kind, the elements of which do not resonate at frequencies within the speech range. By means of the present invention the inertias and elastances of the mechanical parts are proportioned to cooperate in functioning as a band filter having a transmission band wide enough to include all frequencies needed for the highest quality reproduction and also to effect whatever wave transformation is needed for efficient transfer of energy.

The mechanical moving system comprises two groups of elements, one of which transmits torsional vibrations and the other longitudinal vibrations. The first group includes a light but relatively stiff shaft 20 to one end of which is rigidly attached a balanced magnetic armature 19 having the form of a double ended wedge, and to the other end of which is attached a rectangular cross bar 22. The shaft 20 is supported on a wedge pivot block 23, the sharp edge of which engages with a longitudinal V groove cut to the centre line of the shaft. The angle of the groove is slightly greater than the angle of the pivot block so that a limited angular motion is possible. The block is supported upon the base 24 which forms part of the rigid framework of the apparatus. To hold the shaft firmly in place without interfering with its rotational motion the centre portion of the V block is cut away and a light stiff wire 25 passing through two holes in the end portions of the block engages with an eye in the threaded pin 26 attached to the shaft. The motion of the armature and shaft is resisted by a pair of leaf compression springs 27 which are attached at one end to the cross bar 22 and at their other ends to the base 24.

The second group of parts, in which the motion is longitudinal, includes the receiver diaphragm 30 and the spider element 31 the toes of which are riveted to the diaphragm. The purpose of the spider element is to impress the driving force upon the diaphragm in such a manner that the latter moves nearly uniformly over its whole surface, thereby acting like a rigid piston upon the air in the chamber 29. Since this element should be made as light as possible it is difficult to avoid flexibility in its construction and it is more practical to proportion the elastance to cooperate with the elastances of the other elements to produce a desired transmission characteristic. The air in the chamber 29 in front of the diaphragm also constitutes an element of this group, the form of the chamber being such that the elastance of the air body is its predominating property. The diaphragm is constructed to act as nearly as possible like an air-tight frictionless piston of negligible mass. To this end it is made of thin aluminum foil and is provided with circular corrugations to give it rigidity. The edge of the diaphragm is clamped to the walls of the air chamber by a clamping ring 32 thus ensuring air-tightness but at the same time introducing a slight resistance to motion due to the elastance of the diaphragm. The two groups are connected by the angled rod 28, one end of which is riveted to the centre of the spider 31, the other end being rigidly connected to the end of the cross bar 22. Besides acting as a means for converting rotational to longitudinal motion, the bent section of this rod provides an elastic connection between the two groups of elements.

The electrical and the mechanical systems are coupled electromagnetically. The armature 19 is placed between two U shaped pole pieces 21 of a permanent magnet 33 and is normally held by the springs 27 in a symmetrical position relatively to all four pole faces. Encircling the armature but not mounted thereon or in any way attached are the energizing coils 34 through which flow the speech currents. An electric source 35 is indicated in the electric circuit the internal impedance of which is represented by the resistance 36. The connection between the source 35 and the coils 34 includes electrical filter elements 37 and 38.

The terminating load at the acoustic end of the system is an amplifying horn 39 the throat alone of which is illustrated. The type of horn that should preferably be used is the exponential type described in the copending application of H. C. Harrison, Serial No. 628,168 filed March 28, 1923 and also by Hanna and Slepian, "The function and design of horns for loud speakers," Transactions of American Institute of Electrical Engineers, March, 1924. The advantage of this horn is that it offers a constant and purely dissipative load at all but very low frequencies to pressure forces impressed upon it, that is, it is analogous to a constant resistance load in an electrical circuit.

To secure an efficient magnetic structure it is necessary that the air gaps between the armature 19 and the pole faces be small and in consequence the motion of the armature must also be confined to minute displacements. That part of the moving system must therefore be stiff or in other words have a high impedance. The input impedance of a horn is generally considerably lower than that of the armature and the moving system in consequence will generally be arranged for stepping down in impedance. In the system illustrated the over-all impedance ratio is the resultant of several intermediate transformations each having for its object the more effective coupling of successive elements to enable them to function properly as elements of a uniform filter.

*Method of design.*

The method of applying the present invention in the design of the system will be more easily understood by referring to Figs. 10 and 11 which represent the equivalent electrical circuits. In Fig. 10 the mass of each mechanical element is indicated by an inductance symbol and the elastances by capacity symbols. The effective mass of each element is designated by the letter $m$ with a numerical subscript corresponding to the reference number used to designate the element in Figures 7, 8, and 9. The elastances are designated in a similar manner. The acoustical portion of the system is represented by the shunt elastance $S_{29}$ and the horn resistance $R_{30}$ the two being coupled through a transformer 40 which represents the transforming action of the connection between the enlarged air chamber 29 and the narrow aperture of the horn. The mass and elastance coefficients referring to the elements in which the motion is linear are the linear coefficients modified to bring them into uniformity with the coefficients of the elements having angular motion. The linear masses are multiplied by the square of the radius from the centre of the shaft 20 to the centre line of the linear motion to give the equivalent angular masses. The linear elastances are divided by the same factor. The linear displacements are equal to the angular displacements multiplied by the radius and the linear forces are equal to the torsional moments divided by the radius.

The element 41 represents the coupling impedance between the electrical and the mechanical systems. The theory of this type of coupling is given by R. L. Wegel, Theory of Telephone Receivers, Journal of A. I. E. E. Vol. XL No. 10, Oct., 1921. The coupling impedance is defined as the ratio of force in the mechanical system to the current in the electrical system, and conversely as the ratio of the back E. M. F. in the electrical system to the velocity in the mechanical system. The two ratios are equal and have the same value at all frequencies but are of opposite sign.

The elastance $S_{19}$ represents the control of the armature due to the attraction of the permanent magnet poles. When the armature is in a central position the attractions of all four pole faces are balanced but if it is slightly displaced the attractive forces are increased in the smaller air gaps and decreased in the larger, the result being an unbalanced force tending to increase the displacement. In a magnetic system of the type described the torque due to the field is substantially proportional to the angular displacement of the armature. The ratio of the torque to the displacement is therefore of the nature of a negative elastance. The value of $S_{19}$ may be shown to be equal to $$-\frac{A}{\pi l}(\beta B)^2 \quad (11)$$

in which $A$ is the area of each pole face, $l$ the normal air gap length, $\beta$ the distance from the centre of the armature to the centre of the pole faces, and B is the flux density of the permanent magnet flux in the air gap.

Fig. 11 represents the uniform band pass filter to which Fig. 10 is potentially equivalent; that is to say if the elements of Fig. 10 are properly proportioned the system may be made to possess all the characteristics of the band filter of Fig. 11. It will be noted that Fig. 11 includes two transformers 42 and 43; these are ideal transformers which with their associated shunt elastances are replaced in Fig. 10 by T networks of elastances proportioned in accordance with the values shown in Fig. 1ª. The first transformation is introduced to permit the real negative elastance of the field $S_{19}$ to be incorporated in the filter. In the design of electrical transforming filters it was pointed out that the negative branches of transforming networks could not be embodied separately in any physical structure and as a result certain limitations are placed upon the possible transformation ratios. In this instance the negative elastance has a real existence and may be used as an actual filter element.

When the transforming T network of Fig. 10 is replaced in Fig. 11 by the combination of an ideal transformer and a shunt elastance there must necessarily be left in each adjacent series arm a residual positive elastance to maintain the proper band pass filter characteristics. The section of Fig. 11 between the lines JJ' and KK' includes the coupling impedance and two series impedances. On the mechanical side the series impedance is made up of a mass denoted by $\tfrac{1}{2}m_q$, and an elastance denoted by $\tfrac{1}{2}S_q$. These are parts respectively of the armature mass $m_{19}$ and the residual positive elastance of the series branch of the filter, their fractional values being so far undefined. The electrical impedance includes an inductance $\tfrac{1}{2}L_p$ and a capacity $2C_p$ which, similarly, are fractions, at present undefined, of the elements $L_{34}$ and $C_{38}$. The magnitude of the mechanical impedance is denoted by $\rho M$ the factors of which may also remain undefined at present. The impedances of the series arms of the section may be denoted respectively by the generalized impedance symbols $\tfrac{1}{2}Z_q$ and $\tfrac{1}{2}Z_p$.

It follows by a short analysis from the equations given by Wegel in the aforementioned reference that the proper impedances in which the section should be terminated to avoid reflection loss are given by the equations $$Z_e = \sqrt{\frac{Z_p^2}{4} + \rho^2 M^2 \frac{Z_p}{Z_q}} \quad (12)$$

$$Z_m = \sqrt{\frac{Z_q^2}{4} + \rho^2 M^2 \frac{Z_q}{Z_p}}$$

$Z_e$ being impedance on the electrical side and $Z_m$ the impedance on the mechanical side.

If $Z_p$ and $Z_q$ are linearly related the factor $\rho$ may be defined as the ratio $$\sqrt{\frac{Z_q}{Z_p}}$$

in which case the terminating impedances are $$Z_e = M\sqrt{1 + \frac{1}{4}\left(\frac{Z_p}{M}\right)^2} \quad (13)$$

$$Z_m = \rho^2 Z_e$$

The impedances $Z_e$ and $Z_m$ have the same form as the mid series iterative impedance of the so-called "constant $k$" type of band pass wave filter described by Campbell and by Zobel, that is, a filter in which the product of the series and shunt impedances is constant at all frequencies. It follows therefore that the section may be connected at JJ' and KK' to mid series, terminated constant $k$ filters having the same type of series impedances as $Z_p$ or $Z_q$. In the Zobel reference it is pointed out that certain other types of filters which are not of the "constant $k$" type are also capable of being connected to "constant $k$" sections, a principal condition being that the series impedances should be of the same type when the connection is to be made between mid series terminated sections. In the system illustrated the type of filter section used is suitable for connection to the "constant $k$" coupling section. The factor $\rho^2$ evidently represents a transformation ratio but since it relates mechanical to electrical impedance it is not a pure numeric. The factor M is the force factor for a symmetrical system in which the transformation is unity.

That the coupling section has transmission characteristics also similar to those of a band filter may be seen by considering its physical properties when it is terminated in the impedance $Z_e$ and $Z_m$. If the series impedance $\tfrac{1}{2}Z_p$ contain only pure reactances, $Z_e$ and $Z_m$ may at different frequencies be either pure reactance or pure resistance but cannot be complex. No energy can enter or flow through the system when $Z_e$ and $Z_m$ are reactive, consequently the pass band frequencies must be those for which $Z_e$ and $Z_m$ are resistive. The limiting frequencies of the transmission band are found to be:

$$f_1 = \frac{1}{2\pi}\left\{\sqrt{\frac{M^2\rho^4}{m_q^2} + \frac{S_q}{m_q}} - \frac{M\rho^2}{m_q}\right\}$$
$$f_2 = \frac{1}{2\pi}\left\{\sqrt{\frac{M^2\rho^4}{m_q^2} + \frac{S_q}{m_q}} + \frac{M\rho}{m_q^2}\right\} \quad (14)$$

The half series impedances of the filter sections connected to the coupling section comprise on the electrical side the capacity $2C_p'$ and the inductance $\tfrac{1}{2}L'_p$, and on the mechanical side the mass $\tfrac{1}{2}m'_q$ and the elastance $\tfrac{1}{2}S_q'$. These quantities are related to the corresponding coefficients of the coupling section series branches by factors that involve only the ratio of the cutoff frequencies. The total coefficients of the electrical series arm must evidently be equal to $C_{38}$ and $L_{34}$; on the mechanical side the sum of the masses must equal that of the armature and the total elastance equal the residual positive elastance. For the particular types of filter section employed the following relationships are found:

$$\left.\begin{array}{l} C_{38} = 2C_p \dfrac{f_2}{f_1+f_2} \\ L_{34} = L_p = \dfrac{1}{2}L_p + \dfrac{1}{2}L'_p \\ m_{19} = m_q = \dfrac{1}{2}m_q + \dfrac{1}{2}m'_q \\ S_r = \dfrac{1}{2}S_q \dfrac{f_1+f_2}{f_2} \end{array}\right\} \quad (15)$$

in which $S_r$ is the residual positive elastance of the mechanical series branch.

The force factor $\rho M$ for the magnetic structure illustrated is given by the equation:

$$\rho M = \sqrt{\dfrac{\beta^2 B^2 L_p A d}{\pi l}} = \sqrt{-S_{19} d L_p} \quad (16)$$

The factor $\beta$, $B$, $A$ and $l$ having the same meaning as in formula 11. The factor $d$ denotes the fraction of the total flux of the energizing coils that is effective in the polar air gaps. From equations 14, bearing in mind that $\rho$ defines the ratio of "$m_q$" to $L_p$, and expression may be found for the band width in terms of the negative elastance and the armature mass, namely:

$$S_{19} = -\dfrac{\rho^2 M^2}{dL_p} = -\dfrac{m_q}{d}\pi^2(f_2-f_1)^2 \quad (17)$$

The band width is thus determined completely by the dimensions of the magnetic structure, and the manner of proportioning the parts to secure a large band width is indicated. The actual location of the band remains to be determined. This may be done by considering the relationship that must exist between the elastances $S_{19}$ and $S_{20}$ to maintain the filter transmission characteristic. Applying the formulæ relating to the equivalence of Figures 1 and 1ª to the coefficients of Figures 10 and 11 it is found that $$S_{19} - S_r = \dfrac{1-\phi_T}{\phi_T} S_{20} \quad (18)$$

$\phi_T$ being the ratio of transformation of transformer 42. From the formulæ for the coefficients of the filter sections it is also found that:

$$S_r = \dfrac{S_{20}}{\phi_T} \cdot \dfrac{2f_1}{f_2-f_1} \quad (19)$$

and consequently that $$S_{20} + S_{19} = \dfrac{S_{20}}{\phi_T} \cdot \dfrac{f_2+f_1}{f_2-f_1} \quad (20)$$

Further it is found from the filter formulæ that $$\dfrac{S_{20}}{m_q \phi_T} = \pi^2(f_2^2 - f_1^2) \quad (21)$$

and finally from equations 20 and 21

$$\dfrac{S_{20}+S_{19}}{m_q} = 4\pi^2\left(\dfrac{f_1+f_2}{2}\right)^2 \quad (22)$$

Equation 22 shows that the location of the band is determined when the shaft elastance $S_{20}$, the field elastance $S_{19}$, and the armature mass $m_q$ are given. The band limits should be chosen so as to include all essential voice frequencies, the lower limit could theoretically be placed at zero but this is obviously impracticable as it would require that the whole mechanical system move continuously under the influence of a direct current input. In practice a lower frequency limit of about 100 cycles per second is commonly used. The choice of the band limits determines the elastance $S_{20}$ of the shaft 20; the transformation ratio $\phi_T$ is thereafter determined by equation 21. The coefficients of the remaining mechanical elements are related to the armature mass $m_q$ and the elastance $S_{20}$ in terms of the transformation ratio $\phi_T$, the ratio $\phi_U$ of transformer 43, and the factor connecting the series and shunt elastance of the filter. As the series elastance $S_{31}''$ associated in Fig. 11 with the mass $m_{31}$ of the spider element is zero in the actual system the transformation ratio $\phi_U$ must have a special limiting value such as obtains in Figs. 5ª and 6ª. The value of $\phi_U$ is found to be $$\phi_U = \dfrac{f_2^2 - f_1^2}{f_2^2 + 3f_1^2} \quad (23)$$

The expression for the masses and elastances are the following $$\left.\begin{array}{l} m_{22} = \phi_T^2 m_q \\ m_{31} = m_{30} = \phi_T^2 \phi_U^2 m_q \\ S_{27} = S_{20}\phi_T\left[\dfrac{3f_1^2+f_2^2}{f_2^2-f_1^2}+(1-\phi_U)\right]-S_{20} \\ S_{28} = \phi_T\phi_U S_{20} \\ S_{31} = \phi_T\phi_U^2 S_{20} = \dfrac{1}{2}S_{29} \\ S_{30} = \phi_T\phi_U^2 S_{20}\dfrac{4f}{f_2^2-f_1^2} \end{array}\right\} \quad (24)$$

The capacities of the electrical circuit may be determined from the inductance of the energizing coil 34 by the equations $$\begin{array}{l} \dfrac{1}{C_{38}} = L_{34} \times 4\pi^2 f_1\left(\dfrac{f_1+f_2}{2}\right) \\ \dfrac{1}{C_{37}} = 2\pi^2(f_2^2 - f_1^2)L_{34}. \end{array} \quad (25)$$

The primary factors in the design of the system have been shown to be the angular mass $m_q$ of the armature, the field elasticity $S_{19}$ and the leakage factor $d$ of the energizing coils. The angular mass $m_q$ of the armature is most readily determined from its geometrical dimensions but geometrical formulæ for the other two factors become very complex if high accuracy is required. These factors may be determined with accuracy from impedance measurements upon a magnetic system under certain simplifying circuit arrangements.

Clamping the cross bar 22 so that it is rigidly held restricts the motion of the system to the armature 19 and the shaft 20 and is equivalent to opening the circuit of Fig. 10 at the connection of $m_{22}$ to $S_{20}$. Under this condition the impedance to an alternating E. M. F. impressed directly upon the terminals of the coil 34 may be shown to be given by the equation $$Z_P' = R_P + j2\pi f L_P - j\frac{\rho^2 M^2}{2\pi f m_q - \frac{S_{20}+S_{19}}{2\pi f}} \quad (26)$$

in which $R_P$ and $L_P$ are respectively the effective resistance and the inductance of the coils 34 and the armature at rest in its normal position. The impedance $Z_P'$ is the impedance of the system measured at the coil terminals, or the apparent impedance of the coil when the armature is in motion. If the impedance is measured at a large number of frequencies covering a wide range, a resonance value will be found which corresponds to the resonance of the armature mass $m_2$ and the resultant elastance, $S_{19}+S_{20}$. If this resonance frequency is denoted by $f_a$ the resultant elastance is expressed by $$S_{19}+S_{20} = 4\pi^2 f_a^2 m_q \quad (27)$$

Similar measurements made with the permanent magnet removed so that the field elastance $S_{19}$ is negligibly small determine the frequency at which the mass of the armature resonates with the elastance of the shaft. Denoting this frequency by $f_b$, which is greater than $f_a$, the expression for the shaft elastance may be written $$S_{20} = 4\pi^2 f_b^2 m_q \quad (28)$$

The determination of these two resonance frequencies gives both elastance $S_{19}$ and $S_{20}$. It will be noted that the frequency $f_a$, according to equation (22) is the mid frequency of transmission band, in practice it is generally between 2000 c. p. s. and 3000 c. p. s.

The factor $d$ may be found by comparing at some relatively low frequency, preferably between 400 c. p. s. and 800 c. p. s., the apparent inductance of the system while the armature is in motion with the inductance while the armature is at rest in its central position. To determine the latter inductance the armature must be held rigidly in its normal position of rest. If the value of the force factor $\rho M$ given by equation (16) is substituted in equation (26) an expression for the factor $d$ can be found, namely $$d = \left(1 - \frac{L_P'}{L_P}\right)\frac{f_a^2 - f^2}{f_a^2 - f_b^2} \quad (29)$$

in which $L_P'$ is the apparent inductance of the coil as modified by the motion of the armature and $f$ is the frequency at which $L_P'$ is measured.

An advantageous feature of the structure described is that the control of the system by means of the springs 27, being effected in a different section of the filter, does not add to the mass of the armature and therefore does not diminish the possible band width.

This control is necessary to stabilize the system in the presence of the negative elastance of the field and if applied directly to the armature an undersirable mass is added thereto by the springs themselves and the means of attachment so that the transmission range is noticeably reduced. Further the step-up transformation between the armature and the cross-bar requires the mass of the latter to be considerably greater than that of the armature and so permits the spring control system to be substantially designed.

In the appended claims the term impedance is to be understood in the broader sense of the foregoing description as the ratio of an impressed force to the velocity resulting therefrom. The force may be electrical or mechanical and if mechanical may be in the nature of a simple linear force or a torsional moment or again an excess of pressure over the normal pressure of a gas. The velocity or intensity of motion in each case must be of a corresponding type, actually it is the quantity the product of which with the force gives the time rate of change of energy. The terms reactance and resistance when used in the claims define the imaginary and the real components of impedance and by analogy have the same breadth of application as the term impedance.

To define the properties of an element whereby it offers a reactive impedance to an impressed force the terms inertia and elastance will be used in relation to both mechanical and electrical systems.

The general sense of series and shunt connection has been made clear by the detailed description of the properties of the analogous electrical and mechanical systems.

What is claimed is:

1. In a broad band wave filter an unsymmetrical filter section adapted to couple together two portions of the filter having unequal characteristic impedances the ratio of which is a constant numerical quantity $\phi^2$, said unsymmetrical section comprising a "T" network having two series impedances $Z_1$ and $Z_2$ and a shunt impedance $Z_3$, these impedances being the resultants of the combinations expressed by the equations $$Z_1 = Z + Z_a(1-\phi)$$
$$Z_2 = \phi^2 Z - \phi Z_a(1-\phi)$$
$$Z_3 = \phi Z_a$$

in which $Z$ and $Z_a$ are respectively the series and the shunt impedances of a symmetrical "T" section adapted to cooperate directly with one of said filter portions in maintaining the broad band frequency selectivity.

2. A broad band wave filter section comprising in the form of an unsymmetrical "T" network series impedances denoted by $Z_1$ and $Z_2$ respectively and a shunt impedance $Z_3$, said impedances being related to the series impedances $Z$ and the shunt impedance $Z_a$ of a symmetrical prototype filter section, having predetermined characteristic impedance and band limits, in accordance with the equations $$Z_1 = Z + Z_a(1-\phi),$$
$$Z_2 = \phi^2 Z - \phi Z_a(1-\phi),$$
$$Z_3 = \phi Z_a,$$

in which $\phi$ is a constant numerical quantity different from unity, whereby the unsymetrical section is adapted to transform the wave motion in the ratio $\phi$ while at the same time maintaining the transmission band limits of the prototype section.

3. In combination in a broad band wave filter a three branch network of reactive impedances the magnitudes of which are related by constant factors at all frequencies, two of said impedances being of opposite sign, and the values of said impedances being proportioned with respect to the other impedance elements of the filter to produce a transformation of the amplitude of waves traversing the filter while at the same time maintaining the wave selective characteristics.

4. In combination in a broad band wave filter a network comprising a group of three elastances, two of which enter into series branches of the filter, and the third being included therebetween as a coupling element, the elastances in the series branches being opposite in sign to each other, and the magnitudes of said elastances being proportioned with respect to the remaining elements of the filter to produce a transformation of the motion of waves traversing the filter while at the same time maintaining the wave selective characteristics.

5. In a wave filter, an unsymmetrical filter section adapted to transform the intensity of wave motion and including, for the purpose of said transformation, a network of three reactive impedances of like type one of which has a negative value with respect to the other two, a second filter section connected to said unsymmetrical section, a positive impedance in said second section of like type to said negative impedance, said positive impedance and said negative impedance being combined to produce a zero resultant impedance.

6. In an electromagnetic device for translating electric wave energy into the energy of mechanical motion, a magnetic armature, a constant polarized field therefor, whereby said armature is subject to the control of negative elastance, a moving system comprising a chain of connected inertia elements and elastance elements constituting a broad band wave filter, an elastic coupling between said armature and said system and a series elastance in said system, said series elastance being proportioned conjointly with said negative elastance and said elastic coupling to transform the amplitude of vibration of said armature while at the same time maintaining the wave transmission characteristics of the filter.

7. In an electromagnetic device for translating electric wave energy into the energy of mechanical motion, a magnetic armature, a polarizing magnetic field therefor, whereby said armature is controlled by a negative elastance, an inertia element coupled to said armature by an elastic coupling element and restrained from free motion by a second elastic element, said negative elastance and the elastances of said coupling element and said second element being so proportioned in conjunction with the masses of said armature and said inertia element to constitute a broad band wave filter section adapted to transform the amplitude of mechanical vibrations impressed upon said armature.

8. In an electromechanical broad band wave filter an unsymmetrical section comprising a "T" network of reactive impedances and having an elastance included in each branch, the elastance in one series branch being of negative sign, and the three elastances being proportioned to effect a transformation of the wave motion while at the same time maintaining the wave transmission characteristics of the filter.

9. A composite electrical and mechanical wave transmission system comprising an electrical network, a connected chain of mechanical elements and an electromagnetic wave translating device, said network and said chain of elements and said translating device including reactive impedance elements disposed in series and shunt relation and proportioned to constitute a band pass wave filter having band frequency limits both different from zero, and said mechanical system including unsymmetrical sections adapted by the sense and degree of their dissymmetry to transform the amplitude of the wave motion in a predetermined ratio, while at the same time maintaining the wave transmission characteristics of the filter.

10. In combination with an electromagnetic device for translating electric wave energy into the energy of mechanical motion, a chain of mechanically connected elements constrained to torsional motion and adapted to be driven by said electromagnetic device, a second chain of mechanically interconnected elements constrained to linear motion, and a coupling element between said chains comprising a flexible bent arm, said chains comprising elastance and inertia elements so proportioned to constitute each of said chains, a band pass filter adapted to transmit vibrations according to its typical mode of motion, and said coupling element functioning to translate the motion from the one mode to the other.

11. An impedance transforming wave filter adapted to transmit selectively waves in a desired broad band of frequencies, comprising two portions having unequal characteristic impedances, and a coupling section included between said portions, said coupling section comprising an unsymmetrical system of connected impedances having precomputed values dependent upon the limiting frequencies of the desired broad band and upon the unequal characteristic impedances of the connected filter portions whereby the filter will transmit waves without reflection at its internal junction points, and will transform the amplitudes of the waves in accordance with ratio of the impedances of the two portions.

12. An unsymmetrical wave filter section comprising a connected system of series and shunt impedances, said impedances having precomputed values dependent upon the upper and lower limiting frequencies of a range of frequencies it is desired to transmit, and dependent also upon two preassigned impedance values which are in a constant ratio different from unity, whereby the filter section is adapted to be connected between unequal impedances of the preassigned values, and when so connected will transmit, with negligible attenuation and without reflection, waves of frequencies within the desired range while attenuating waves of other frequencies.

13. An impedance transforming wave filter having a broad band transmission characteristic, characterized in this that there is included as an impedance transforming means of constant transformation ratio a connected system of similar impedances, the coefficients of which are proportioned with respect to each other in accordance with the desired transformation ratio, and with respect to the other impedances of the wave filter to co-operate in maintaining the broad band transmission characteristic.

14. An impedance transforming wave filter adapted to transmit selectively waves in a desired broad band of frequencies comprising two portions having unequal characteristic impedances which are in a constant ratio, and a coupling system included between said said portions, said system comprising a group of three similar impedances, the values of which are precomputed with respect to each other in accordance with the said ratio of the characteristic impedances, and in accordance with the limiting frequencies of the desired band, whereby the coupling system is equivalent to the combination of an impedance element of one portion of the filter with an ideal transformer having a transformation ratio equal to the ratio of the charateristic impedances of the two portions.

In witness whereof, I hereunto subscribe my name this 21st day of November, A. D., 1924.

EDWARD L. NORTON.